(12) United States Patent
Oswald

(10) Patent No.: US 8,334,995 B2
(45) Date of Patent: Dec. 18, 2012

(54) METHOD AND SYSTEM FOR ADAPTIVE CONTROL OF IMAGING NODE

(75) Inventor: Tommy Lee Oswald, Tigard, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 1219 days.

(21) Appl. No.: 11/901,752

(22) Filed: Sep. 19, 2007

(65) Prior Publication Data
US 2009/0073486 A1    Mar. 19, 2009

(51) Int. Cl.
*G06K 15/00* (2006.01)

(52) U.S. Cl. ................................. 358/1.15; 358/1.13

(58) Field of Classification Search .............. 358/1.15
See application file for complete search history.

(56) References Cited

U.S. PATENT DOCUMENTS

| | | | |
|---|---|---|---|
| 4,914,585 A | 4/1990 | Packard et al. | |
| 5,587,378 A | 12/1996 | Suzuki et al. | 514/263.24 |
| 6,498,657 B1 | 12/2002 | Kuntz et al. | 358/1.15 |
| 6,747,753 B1 | 6/2004 | Yamamoto | |
| 7,068,383 B1 | 6/2006 | Bello et al. | 358/1.15 |
| 7,117,209 B2 | 10/2006 | Yaeger | 707/7 |
| 7,190,477 B2 | 3/2007 | Ferlitsch | 358/1.15 |
| 2002/0054326 A1 | 5/2002 | Morita | |
| 2003/0151760 A1* | 8/2003 | Berndt et al. | 358/1.14 |
| 2003/0185220 A1 | 10/2003 | Valenci | 370/398 |
| 2004/0001218 A1 | 1/2004 | Christiansen | 358/1.15 |
| 2004/0184071 A1 | 9/2004 | Garg et al. | 358/1.15 |
| 2005/0030580 A1 | 2/2005 | Moroi | |
| 2005/0185219 A1* | 8/2005 | Watanabe | 358/1.16 |
| 2006/0095145 A1* | 5/2006 | Yamada | 700/19 |

FOREIGN PATENT DOCUMENTS

| | | |
|---|---|---|
| JP | 2003/256216 | 9/2003 |
| JP | 2006048725 | 2/2006 |
| WO | WO00/23919 | 4/2000 |

* cited by examiner

*Primary Examiner* — Marivelisse Santiago Cordero
*Assistant Examiner* — Kent Yip
(74) *Attorney, Agent, or Firm* — Scot A. Reader

(57) ABSTRACT

Methods and systems for adaptive control of an imaging node allow subsystems of the imaging node to dynamically register authorized commands with a pre-parser after which the pre-parser authorizes inbound line commands for execution by reference to the dynamic registrations. The methods and systems permit highly extensible and granular control over the imaging node, for example, by allowing a user to dynamically unlock and control registered options of the imaging node that are not otherwise controllable, for example, via a standard management protocol or proprietary Web interface.

16 Claims, 4 Drawing Sheets

METHOD AND SYSTEM FOR ADAPTIVE CONTROL OF IMAGING NODE

BACKGROUND OF THE INVENTION

The present invention relates to controlling imaging nodes and, more particularly, to methods and systems making control of imaging nodes more adaptive.

Conventionally, control over an imaging node, such as a multifunction printer (MFP) node, has been limited to largely coarse and static controls offered by industry standard management protocols and proprietary Web interfaces supported by the imaging node. These controls have often failed to meet diverse objectives of imaging node users and have been slow to change. Industry standard management protocols supported by imaging nodes, such as Simple Network Management Protocol (SNMP) and Internet Printing Protocol (IPP), define a limited set of controls that cannot be supplemented without action of the Internet Engineering Task Force (IETF). Moreover, any new controls that are approved through IETF action are limited and require a software upgrade to implement. Proprietary Web interfaces to imaging nodes provide controls that can be supplemented without action by an industry standards body. However, such Web controls are limited to those that the imaging node manufacturer decides to support. Moreover, software changes are required to implement any new Web controls that might be offered. For example, new Web pages must be created to accept user inputs for new controls and software hooks must be coded to bind the new Web pages to the controlled subsystems of the imaging node.

SUMMARY OF THE INVENTION

The present invention, in a basic feature, provides methods and systems for adaptive control of an imaging node. The methods and systems allow subsystems of the imaging node to dynamically register authorized commands with a pre-parser after which the pre-parser authorizes inbound line commands for execution by reference to the dynamic registrations. The methods and systems permit highly extensible and granular control over the imaging node, for example, by allowing a user to dynamically unlock and control registered options of the imaging node that are not otherwise controllable, for example, via a standard management protocol or proprietary Web interface.

In one aspect, an imaging node comprises at least one interface, a registry, at least one subsystem and a pre-parser communicatively coupled with the interface, the registry and the subsystem, wherein a profile for the subsystem is stored in the registry and wherein in response to a command line received via the interface and having a line command addressed to the subsystem the pre-parser causes the line command to be executed by the subsystem after verifying that the line command conforms with the profile.

In some embodiments, the profile comprises identities of authorized commands for the subsystem, wherein each authorized command identity comprises a command token associated with an authorized command, an option associated with the authorized command and an address of a routine of the subsystem adapted to execute the authorized command.

In some embodiments, the authorized command identities are defined by the subsystem.

In some embodiments, the pre-parser verifies that the line command has a command token and option that match a command token and option associated with an authorized command for the subsystem before causing the line command to be executed by the subsystem.

In some embodiments, the pre-parser resolves a command token and option in the line command to an address of a routine on the subsystem adapted to execute the line command.

In some embodiments, the subsystem is a registration subsystem and execution of the line command by the registration subsystem causes an authorized command list for an unregistered subsystem to become stored in the registry.

In some embodiments, the subsystem is a registration subsystem and execution of the line command by the registration subsystem causes an authorized command list for a registered subsystem to be removed from the registry.

In some embodiments, the pre-parser and the subsystem comprise firmware executable on the imaging node.

In some embodiments, the command line is a printer job language (PJL) command line.

In some embodiments, the command line further has a pre-parser identifier and a filter on the imaging node directs the command line to the pre-parser after the filter verifies the pre-parser identifier.

In some embodiments, the at least one interface comprises a network interface.

In some embodiments, the at least one interface comprises a user interface.

In another aspect, a method for controlling an imaging node comprises the steps of receiving a command line on the imaging node, identifying the command line as addressed to a pre-parser, identifying a line command in the command line as addressed to a subsystem registered with the pre-parser, identifying the line command as an authorized command for the subsystem, identifying an address of a routine of the subsystem adapted to execute the line command and calling the routine using the address.

In some embodiments, the command line is identified as addressed to the pre-parser based on a pre-parser identifier in the command line.

In some embodiments, the line command is identified as addressed to the subsystem based on a subsystem identifier in the line command.

In some embodiments, the line command is identified as an authorized command for the subsystem based on a command token and an option in the line command.

In another aspect, a method for controlling an imaging node comprises the steps of storing a profile for a subsystem having identities of authorized commands defined by the subsystem, receiving by a pre-parser a command line having a line command, verifying by the pre-parser that the line command conforms with an authorized command in the profile, resolving by the pre-parser from the profile an address of a routine of the subsystem adapted to execute the line command, issuing by the pre-parser to the subsystem using the address the line command and executing by the subsystem the line command.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
FIG. 1 shows a networked imaging system.

In FIG. 1, an imaging system is shown in which methods and systems for adaptive control over an imaging node 130 are operative. The imaging system includes a client node 110 communicatively coupled with imaging node 130 over a communication network 120. Client node 110 is a data communication device, such as a personal computer, workstation, cellular phone or personal data assistant (PDA), that is capable of receiving on a user interface specifications for a print job and generating and transmitting via a network interface, such as an Ethernet interface, a universal serial bus (USB) interface or cellular interface, a print job conformant with the specifications for eventual processing on imaging node 130. Communication network 120 may be a point-to-point connection, such as a wired or wireless Ethernet link or a USB link, or a data communication network that includes one or more local area networks (LANs), wide area networks (WANs), WiMax networks ad-hoc networks and/or other networks each of which may have data communication nodes, such as switches and routers, that operate to communicatively couple client node 110 and imaging node 130. In some embodiments, communication network 120 traverses the Internet. In some embodiments, communication network 120 includes one or more server nodes that act as intermediaries between client node 110 and imaging node 130, for example, by processing and scheduling print jobs initiated by client node 110 for outputting on imaging node 130. Imaging node 130 is an imaging device having a network interface, such as an Ethernet interface or USB interface, that is capable of receiving via a network interface a print job initiated on client node 110 and processing the print job, for example, outputting a hard copy of a print job. Print job processing, germane to the present invention, may involve a pre-parsing operation in which line commands received within the PJL section of the print job are selectively authorized and executed.

Client node 110 has a user interface, a network interface and a memory communicatively coupled with a processor. The user interface has an input mechanism, such as a keyboard, keypad or touch-sensitive navigation tool for accepting inputs from a user and an output mechanism, such as a liquid crystal display (LCD), light emitting diode (LED) display or cathode ray tube (CRT) for displaying outputs to a user. The network interface is a wired or wireless data communication interface, such as an Ethernet interface, a USB interface or a cellular interface, that communicatively couples client node 110 to communication network 120. An operating system installed in the memory and executed by the processor manages operations on client node 110 by creating, scheduling and performing tasks, among them generating print jobs conformant with print job specifications input on the user interface and transmitting the print jobs on the network interface. Print job creation is facilitated by a print driver which may reside on client node 110 or on a server node within communication network 120. Print jobs may have a PJL section providing instructions on how text and graphics are to be printed on pages as well as user-selected print options. The PJL section of a print job may include command lines addressed to a pre-parser on MFP node 130 instructing to unlock or control specific options on MFP node 130. Such PJL command lines may be input directly by the user or may be generated by a print driver in response to user inputs, for example.

Figure 2:
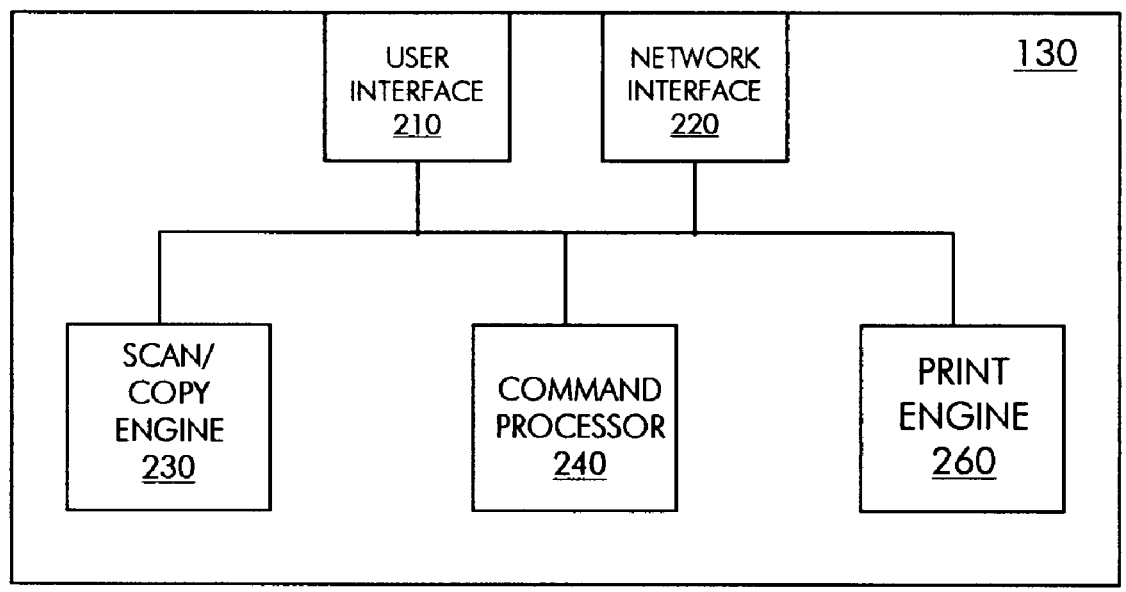
FIG. 2 shows an imaging node in some embodiments of the invention.

In FIG. 2, imaging node 130 is shown in more detail. Imaging node 130 supports multiple functions, such as printing, scanning and copying. Imaging node 130 has a user interface 210, such as a front panel, for accepting inputs from a user and displaying output to a user. Imaging node 130 also has a network interface 220. Network interface 220 is a wired or wireless data communication interface, such as an Ethernet interface or a USB interface, that communicatively couples imaging node 130 to communication network 120. Internal to imaging node 130, interfaces 210, 220 are communicatively coupled with a command processor 240, a scan/copy engine 230 and a print engine 260. The processor 240 and engines 250, 260 have associated memories. Scan/copy engine 230 includes scanner/copier logic, such as one or more integrated circuits (ICs), and a mechanical section for performing a scanning and copying functions. For example, scan/copy engine 230 may have a line image sensor mounted on a movable carriage for optically scanning a document under the control of a scanner IC and storing the scanned document into memory. Print engine 260 includes printer logic, such as one or more ICs, and a mechanical section for performing printing functions. For example, print engine 260 may have a color ink jet head mounted on a movable carriage for printing a document under the control of a printer IC. While in the illustrated embodiments imaging node 130 supports scanning, copying and printing, in other embodiments an imaging node may support additional or different functions, such as faxing or filing, or may support a single function such as printing without scanning or copying capabilities.

Processor 240 manages operations on imaging node 130 by creating, scheduling and performing printing, scanning, copying, spooling, management, diagnostic and other tasks. Such tasks are performed by routines that execute in software installed on processor 240 that in some embodiments comprises firmware. Management tasks performed attendant to enabling advanced and dynamic control over an imaging node 130 include identification by a filter routine executable on processor 240 of inbound PJL command lines that are addressed to a pre-parser routine executable on processor 240 and calling the pre-parser in response to such identification. Inbound command lines destined for the pre-parser may be received in the PJL section of a print job received via network interface 220 or in a PJL snippet received via user interface 210 or network interface 220, for example.

Figure 3:
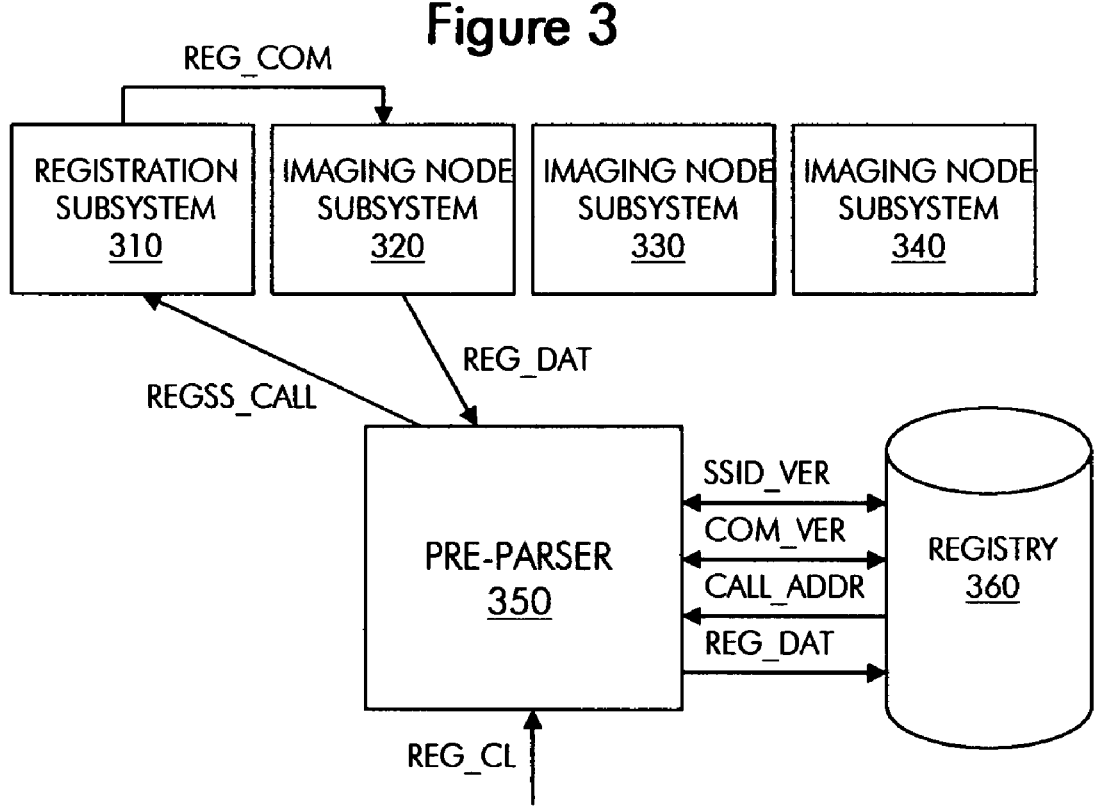
FIG. 3 shows registration command line processing in some embodiments of the invention.

FIG. 3 illustrates registration command line processing in some embodiments of the invention. Registration command line processing involves a registration subsystem 310, one or more of imaging node subsystems 320, 330, 340, a pre-parser 350 and a registry 360, all of which may be executable on processor 240. Registration subsystem 310 registers with pre-parser 350 before such registration command line processing occurs. In the example shown, pre-parser 350 calls registration subsystem 310 with a registration line command (REGSS_CALL) in response to a registration line command (REG_CL) received by pre-parser 350. The call to registration subsystem 310 prompts registration subsystem 310 to issue a command to imaging node subsystem 320 to register with pre-parser 350. By way of example, imaging node subsystem 320 may control scanning on imaging node 130 and pre-parser 350 may call registration subsystem 310 with an activation key that prompts registration subsystem 310 to command imaging node subsystem 320 to register with pre-parser 350 and enable scanning on imaging node 130. As another example, imaging node subsystem 320 may control trace messaging and pre-parser 350 may call registration subsystem 310 with an activation key that prompts registration subsystem 310 to command imaging node subsystem 320 to register with pre-parser 350 and enable trace messaging on imaging node 130.

In the process flow, the registration command line (REG_CL) received by pre-parser 350 is a PJL command line having a pre-parser identifier (PPID) associated with pre-parser 350, a subsystem ID (SSID) associated with registration subsystem 310 and a line command. The line command has a command token and an option, and may also have an option value. In response to the registration command line, pre-parser 350 determines from registry 360 that the SSID in the line command is associated with an imaging node subsystem 320 that is registered, namely registration subsystem 310 (SSID_VER). Pre-parser 350 then looks-up in registry 360 a profile associated with the SSID, namely, the profile associated with registration subsystem 310. From the profile, pre-parser 350 determines that the command token and option in the line command are an authorized command token/option pair (COM_VER). Pre-parser 350 then retrieves from registry 360 an address of a routine on registration subsystem 310 responsible for executing the line command (CALL_ADDR) and calls the routine to have the line command executed (REGSS_CALL). In this instance, the line command is designed to prompt imaging node subsystem 320 to register with pre-parser 350. Thus, in response to the line command, registration subsystem 310 instructs imaging node subsystem 320 (REG_COM) to register with pre-parser 350 in response to which a profile for imaging node subsystem 320 (REG_DAT) is added to registry 360. Importantly, imaging node subsystem 320 defines the command tokens, options and addresses of routines of imaging node subsystem 320 adapted to execute commands in the profile.

In some embodiments, imaging node subsystems 320, 330, 340 may become deregistered with pre-parser 350 in similar vein, for example, pre-parser 350 may call registration subsystem 310 with a deregistration line command prompting registration subsystem 310 to command imaging node subsystem 320 to deregister with pre-parser 350.

Figure 4:
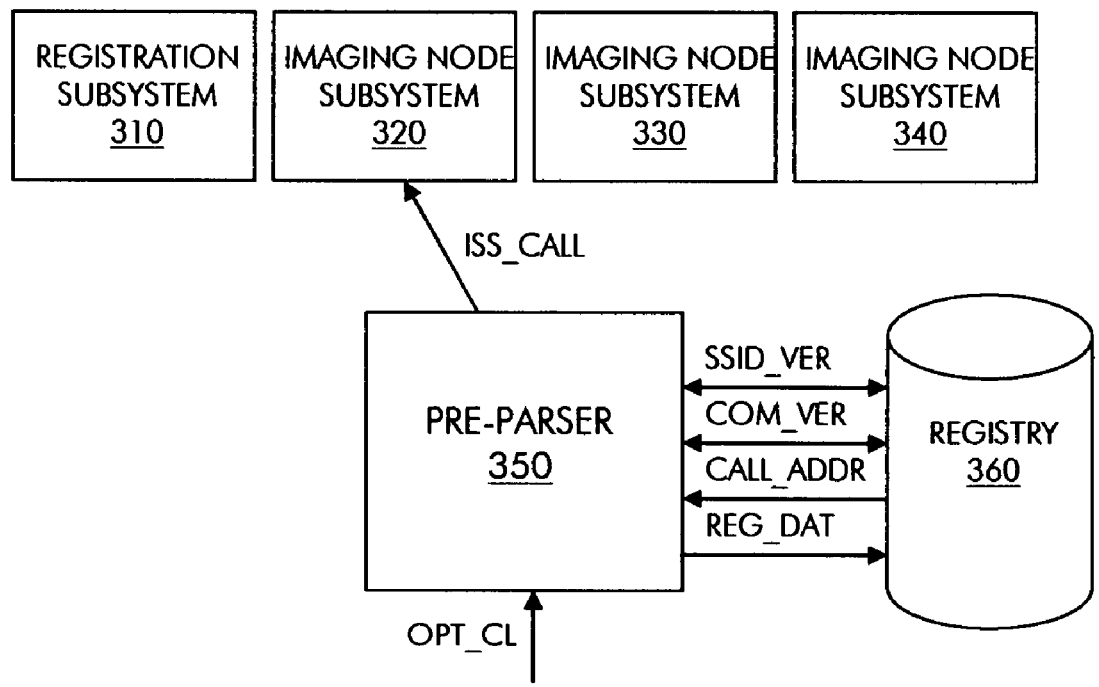
FIG. 4 shows imaging option command line processing in some embodiments of the invention.

FIG. 4 shows imaging option command line processing in some embodiments of the invention. Imaging option command line processing involves a registered one of imaging node subsystems 320, 330, 340, pre-parser 350 and registry 360, all of which may be executable on processor 240. In the example shown, pre-parser 350 calls imaging node subsystem 320 with an imaging option line command in response to an imaging option line command received by pre-parser 350. The call to imaging node subsystem 320 prompts imaging node subsystem 320 to execute the line command. As one of numerous possible examples, imaging node subsystem 320 may control color calibration on imaging node 130 and imaging node subsystem 320 may be called with a line command that prompts imaging node subsystem 320 to apply color calibration to a specific print job.

In the process flow, an imaging option command line (OPT_CL) received by pre-parser 350 is a PJL command line having a PPID associated with pre-parser 350, an SSID associated with imaging node subsystem 320 and a line command. The line command has a command token and an option, and may also have an option value. In response to the command line, pre-parser 350 determines from registry 360 that the SSID is associated with an imaging node subsystem 320 that is registered (SSID_VER). Pre-parser 350 then looks-up in registry 360 a profile associated with the SSID, namely, the profile associated with imaging node subsystem 320. From the profile, pre-parser 350 determines that the command token and option in the line command are an authorized command token/option pair (COM_VER). Pre-parser 350 then retrieves from registry 360 an address of a routine on imaging node subsystem 320 that is responsible for executing the line command (CALL_ADDR) and calls upon the routine to execute the line command (ISS_CALL). In this case, the line command is directed at execution of an imaging option supported by imaging node subsystem 320 and imaging node subsystem 320 executes the line command.

Figure 5:
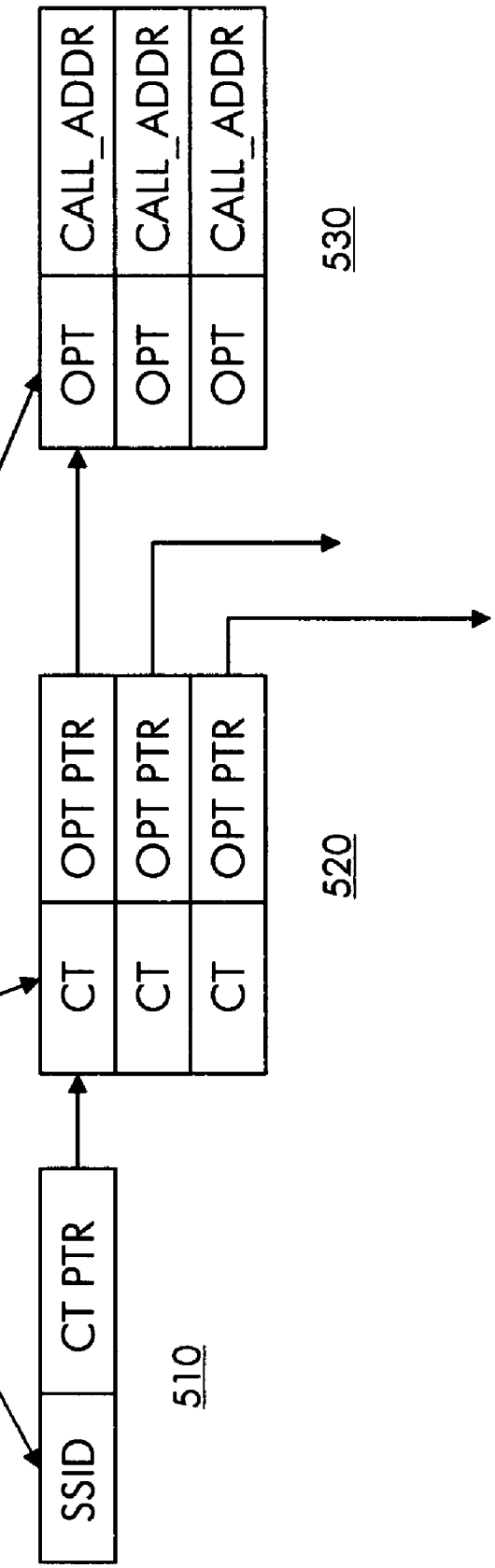
FIG. 5 shows an imaging subsystem profile in some embodiments of the invention.

FIG. 5 shows an imaging node subsystem profile stored in registry 360 in some embodiments. The profile includes identities of authorized commands defined by the imaging node subsystem to which the profile pertains and is stored across three linked tables. Each authorized command identity includes a command token, an object and an address of a routine on the imaging node subsystem for executing the command. More particularly, SSID table 510 has the SSID of the imaging node subsystem to which the profile pertains and a pointer (CT PTR) to an entry within command token table 520 associated with the SSID. Command token table 520 has one or more command tokens (CT) for the imaging node subsystem and pointers (OPT PTR) to entries in option table 530 associated with the respective command tokens. Option table 530 has one or more options (OPT) for each command token and addresses of routines on the imaging node subsystem for executing the commands associated with the respective options. In operation, an inbound command line addressed to a imaging node subsystem is authorized by verifying that a token/option pair in a line command of the command line matches a command token/option pair in a profile for imaging node subsystem stored in registry 360, and is thereafter executed by calling the address of a routine on the imaging node subsystem associated with the matching command token/option pair.

To further illustrate pre-parsing principles and the use of registry 360, consider embodiments of the invention wherein PJL command lines addressed to pre-parser 350 are formatted as follows:

@PJL PPID_CT OPT=OPT VAL and wherein @PJL identifies the command line as a PJL command line, PPID uniquely identifies pre-parser 350, CT is a command token, OPT is an option and OPT VAL is an option value. Moreover, consider that in these embodiments the option begins with the SSID, which is offset from a non-SSID portion of the option by an underscore.

Now consider processing of the inbound PJL command line shown in FIG. 5 that reads:

@PJL SHARP_SET UDP_EVNT_RECDR_ADDR="172.29.237.6"

Upon receipt of the inbound PJL command line, a filter executable on processor 240 recognizes "SHARP" as the identity of pre-parser 350 and thus directs the command line to pre-parser 350. Pre-parser 350, which is configured to parse PJL command lines having the indicated format, locates the SSID "UDP_" in SSID table 510 and uses the associated command token pointer to index an entry in command token table 520. Pre-parser 350 then locates the command token "SET" in command token table 520 and uses the associated option pointer to index an entry in option table 530. Pre-parser 350 then locates the option "UDP_EVNT_RECDR_ADDR" in option table 530. At that point, pre-parser 350 has determined that the line command is directed for imaging node subsystem "UDP_" and is authorized. Pre-parser 350 thus retrieves the address of the routine on imaging node subsystem "UDP_" (CALL_ADDR) associated with the option and uses the address to call the routine with the line command. The routine executes the line command, in particular, by setting the option UDP_EVNT_RECRD_ADDR to the option value 172.29.237.6. If pre-parser 350 had been unable to validate the SSID or the command token/option pair from the line command, pre-parser 350 would have deemed the line command unauthorized and flushed the command line.

Figure 6:
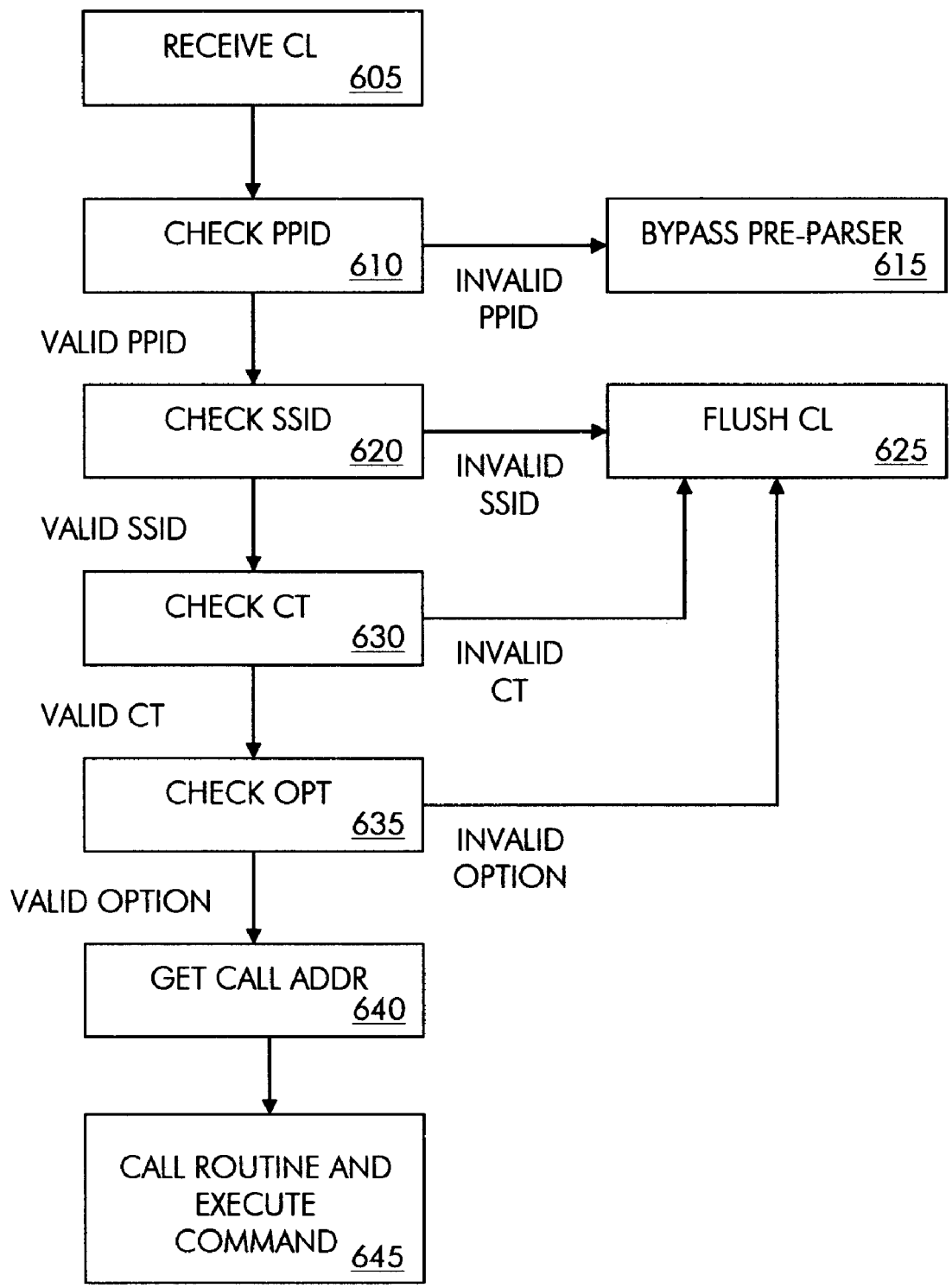
FIG. 6 is a flow diagram showing generic command line processing in some embodiments of the invention.

FIG. 6 is a flow diagram showing generic command line processing in some embodiments of the invention. Processor 240 receives a PJL command line (605) and a filter routine checks for the PPID (610). If the PPID is valid, pre-parser 350 is called and pre-parser 350 looks-up the SSID from the PJL command line in SSID table 510 (620). If the SSID is valid, pre-parser 350 uses the corresponding pointer from SSID table 510 to index command token table 520 and looks-up the command token from the PJL command line in command token table 520 (625). If the command token is valid, pre-parser 350 uses the corresponding pointer from command token table 520 to index option table 530 and looks-up the option from the PJL command line in option table 530 (630). If the option is valid, pre-parser 350 uses the corresponding routine address from option table 510 to call the subsystem associated with the SSID and execute the line command (640). If the PPID is invalid, the command line is not addressed to pre-parser 350 and the command line is processed without resort to pre-parser 350 (615). If the PPID is valid but one of the SSID, command token or option in the command line is invalid, the command line is flushed by pre-parser 350 without execution (625).

It will be appreciated by those of ordinary skill in the art that the invention can be embodied in other specific forms without departing from the spirit or essential character hereof. For example, while the invention has been described in connection with a PJL pre-parser 350, the inventive principles readily extend to other pre-parsers, such as eXtensible Markup Language (ML) and XML Paper Specification (XPS) pre-parsers. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A method for controlling an imaging node having at least one pre-parser and a plurality of imaging node subsystems, comprising:
    receiving by the imaging node a print job language (PJL) command line including a pre-parser identifier (PPID), a subsystem identifier (SSID), a command token and an option;
    selecting by the imaging node, using the PPID, a pre-parser associated with the PPID;
    selecting by the pre-parser from a plurality of command token profiles associated with the plurality of imaging node subsystems, respectively, using the SSID, a command token profile associated with one of the imaging node subsystems;
    selecting by the pre-parser from the selected command token profile, using the command token, an option profile associated with the command token;
    selecting by the pre-parser from the selected option profile, using the option, a call address associated with the option;
    calling by the pre-parser, using the selected call address, a routine associated with the call address and executable on the one of the imaging node subsystems; and
    executing by the routine, using the command token and the option, a command in the PJL command line.

2. The method of claim 1, wherein the PJL command line further includes an option value and the executing step further comprises using the option value.

3. The method of claim 1, wherein the one of the imaging node subsystems is a registration subsystem and the executing step prompts the registration subsystem to issue a command to another imaging node subsystem to register with the pre-parser.

4. The method of claim 1, wherein the one of the imaging node subsystems is a registration subsystem and the executing step prompts the registration subsystem to issue a command to another imaging node subsystem to deregister with the pre-parser.

5. The method of claim 1, wherein the one of the imaging node subsystems controls scanning and the executing step prompts the imaging node subsystem to scan a scan job.

6. The method of claim 1, wherein the one of the imaging node subsystems controls color calibration and the executing step prompts the imaging node subsystem to apply color calibration to a print job.

7. The method of claim 1, wherein the option includes the SSID.

8. The method of claim 1, wherein the pre-parser and the imaging node subsystems comprise firmware executable on the imaging node under processor control.

9. An imaging node, comprising:
    a processor;
    an interface configured receive a print job language (PJL) command line including a pre-parser identifier (PPID), a subsystem identifier (SSID), a command token and an option;
    an imaging node subsystem having a routine configured to execute, using the command token and the option, a command in the PJL command line; and
    a pre-parser communicatively coupled with the interface and the imaging node subsystem and configured to select from a plurality of command token profiles associated with a respective plurality of imaging node subsystems, using the SSID, a command token profile associated with the imaging node subsystem; select, from the selected command token profile, using the command token, an option profile associated with the command token; select, from the selected option profile, using the option, a call address associated with the option; and call, using the selected call address, the routine; and
    a filter configured to receive the PJL command line from the interface and select, using the PPID, the pre-parser.

10. The imaging node of claim 9, wherein the PJL command line further includes an option value and the imaging node subsystem further executes the command using the option value.

11. The imaging node of claim 9, wherein the imaging node subsystem is a registration subsystem and execution of the command prompts the registration subsystem to issue a command to another imaging node subsystem to register with the pre-parser.

12. The imaging node of claim 9, wherein the imaging node subsystem is a registration subsystem and execution of the command prompts the registration subsystem to issue a command to another imaging node subsystem to register with the pre-parser.

13. The imaging node of claim 9, wherein the imaging node subsystem controls scanning and execution of the command prompts the imaging node subsystem to scan a scan job.

14. The imaging node of claim 9, wherein the imaging node subsystem controls color calibration and execution of the command prompts the imaging node subsystem to apply color calibration to a print job.

15. The imaging node of claim 9, wherein the option includes the SSID.

16. The imaging node of claim 9, wherein the pre-parser, the imaging node subsystem and the filter comprise firmware executable on the imaging node under control of the processor.

* * * * *

UNITED STATES PATENT AND TRADEMARK OFFICE
CERTIFICATE OF CORRECTION

PATENT NO. : 8,334,995 B2  
APPLICATION NO. : 11/901752  
DATED : December 18, 2012  
INVENTOR(S) : Tommy Lee Oswald Page 1 of 1

It is certified that error appears in the above-identified patent and that said Letters Patent is hereby corrected as shown below:

Column 8, line 63, "register" is replaced with --deregister--.

Signed and Sealed this  
Twenty-sixth Day of February, 2013

Teresa Stanek Rea  
*Acting Director of the United States Patent and Trademark Office*